(12) United States Patent
Morita

(10) Patent No.: US 11,269,283 B2
(45) Date of Patent: Mar. 8, 2022

(54) FILTER UNIT CAPABLE OF COLLECTING SCATTERED TONER AND IMAGE FORMING APPARATUS

(71) Applicant: KYOCERA Document Solutions Inc., Osaka (JP)

(72) Inventor: Takashi Morita, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 529 days.

(21) Appl. No.: 16/334,171

(22) PCT Filed: Oct. 3, 2018

(86) PCT No.: PCT/JP2018/037065
§ 371 (c)(1),
(2) Date: Mar. 18, 2019

(87) PCT Pub. No.: WO2019/069988
PCT Pub. Date: Apr. 11, 2019

(65) Prior Publication Data
US 2021/0373483 A1     Dec. 2, 2021

(30) Foreign Application Priority Data

Oct. 5, 2017   (JP) .............................. JP2017-195403

(51) Int. Cl.
*G03G 21/20* (2006.01)
*G03G 21/00* (2006.01)
*G03G 15/16* (2006.01)

(52) U.S. Cl.
CPC ....... *G03G 21/0052* (2013.01); *G03G 15/161* (2013.01); *G03G 2215/1661* (2013.01)

(58) Field of Classification Search
CPC . G03G 15/161; G03G 21/0052; G03G 21/206
(Continued)

(56) References Cited

U.S. PATENT DOCUMENTS 10,578,996 B2 * 3/2020 Morita ................. G03G 21/206
11,144,009 B2 * 10/2021 Mizutani ............. G03G 21/206
(Continued)

FOREIGN PATENT DOCUMENTS

JP       2016-090671 A    5/2016
WO       2016146975 A1    9/2016

OTHER PUBLICATIONS

Extended European Search Report dated Mar. 18, 2021 mailed in the corresponding European Patent Application No. 18855138.6.

*Primary Examiner* — William J Royer
(74) *Attorney, Agent, or Firm* — IP Business Solutions, LLC

(57) ABSTRACT

A filter unit (300) includes: a chassis (303) that has a suction portion (301) provided at a front side thereof, has an exhaust portion (302) provided at a rear side thereof, and is provided internally with an upstream filter (331); a plurality of upstream first ribs (323) disposed parallel to sidewalls of the chassis (303) to rise from a bottom surface (322) of the chassis (303) and forming an upstream first airflow path (P11); a plurality of upstream second ribs (313) disposed parallel to the sidewalls of the chassis (303) to rise from a ceiling surface (312) of the chassis (303) and forming an upstream second airflow path (P21); an upstream first shield plate (315) raised from the ceiling surface (312) to cover up a front of the upstream filter (331) while forming an upstream first gap (S11) with the bottom surface (322); and an upstream second shield plate (325) raised from the bottom surface (322) to cover up a rear of the upstream filter (331) while forming an upstream second gap (S21) with the ceiling surface (312).

10 Claims, 8 Drawing Sheets

(58) Field of Classification Search
USPC .......................................... 399/92, 93, 98, 99
See application file for complete search history.

(56) References Cited

U.S. PATENT DOCUMENTS

| | | |
|---|---|---|
| 2015/0013287 A1 | 1/2015 | Yamaguchi et al. |
| 2016/0124384 A1 | 5/2016 | Mizutani |
| 2018/0290474 A1 | 10/2018 | Dunn et al. |

* cited by examiner

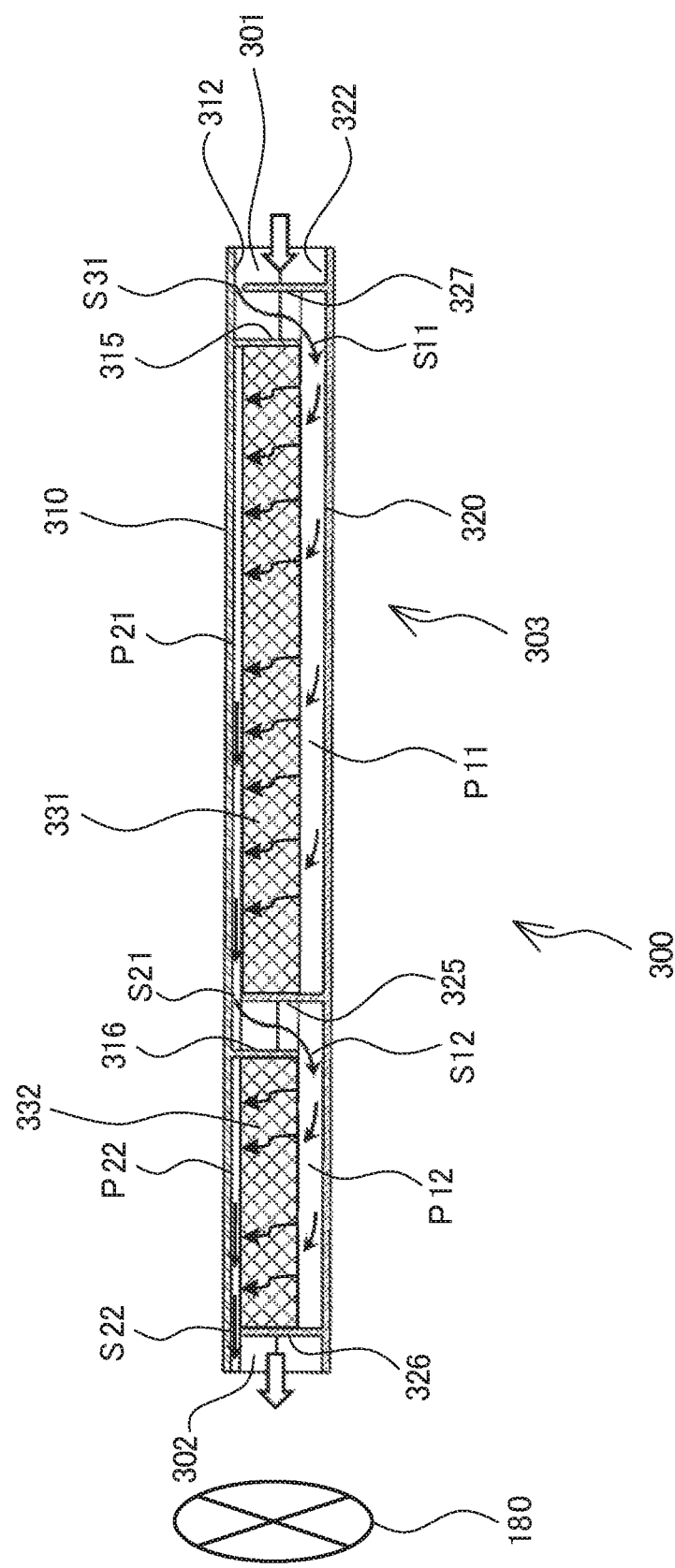

FILTER UNIT CAPABLE OF COLLECTING SCATTERED TONER AND IMAGE FORMING APPARATUS

TECHNICAL FIELD

The present invention relates to filter units and image forming apparatuses and particularly relates to a technique for collecting scattered toner.

BACKGROUND ART

A general image forming apparatus includes a photosensitive drum as an image carrier, a charging device, an exposure device, a developing device, and a transfer device, wherein an image formation process (charging, exposure, development, and transfer) is performed on the photosensitive drum and a toner image is formed on a recording medium.

If the flowability of toner or the amount of charge on the toner decreases, the toner becomes less likely to adhere to the photosensitive drum, so that toner scattering may occur to contaminate the interior and exterior of the image forming apparatus or the toner may fall onto an image to cause an image defect.

CITATION LIST

Patent Literature

Patent Literature 1: JP-A-2016-090671

SUMMARY OF INVENTION

An example of preventing the occurrence of an image defect due to toner scattering is a method of mounting a filter for collecting scattered toner in an image forming apparatus (see, for example, Patent Literature 1 above). However, in the case where such a filter is mounted in a relatively small printer, such as a desktop printer, there arises a problem of difficulty in securing a location where the filter is disposed. Furthermore, if the filter is mounted, the apparatus size may be likely to increase.

The present invention has been made in view of the foregoing circumstances and has an object of thinning a filter unit including a filter capable of collecting scattered toner.

Solution to Problem

A filter unit according to one aspect of the present invention includes: a rectangular parallelepipedic chassis that has a suction portion provided at a front side thereof to suck air therethrough, has an exhaust portion provided at a rear side thereof to exhaust the air therethrough, and is provided internally with a filter capable of collecting powder particles; a plurality of first ribs disposed parallel to sidewalls of the chassis to rise from a bottom surface of the chassis toward an interior of the chassis and forming a first airflow path; and a plurality of second ribs disposed parallel to the sidewalls of the chassis to rise from a ceiling surface of the chassis toward the interior of the chassis and forming a second airflow path, wherein the filter is disposed in the interior of the chassis so as to be sandwiched by the plurality of first ribs and the plurality of second ribs while leaving spaces between the filter and the ceiling and bottom surfaces, and the filter unit further includes: a first shield plate that extends in a direction perpendicular to a direction of extension of the first ribs and the second ribs and is raised from the ceiling surface of the chassis toward the interior of the chassis to cover up a front end of the filter while forming a first gap with the bottom surface of the chassis; and a second shield plate that extends in the direction perpendicular to the direction of extension of the first ribs and the second ribs and is raised from the bottom surface of the chassis toward the interior of the chassis to cover up a rear end of the filter while forming a second gap with the ceiling surface of the chassis.

Furthermore, an image forming apparatus according to one aspect of the present invention is an image forming apparatus including: an intermediate transfer belt mounted around two belt rollers to travel in an endless path around the belt rollers; and a plurality of transfer rollers disposed opposite to a plurality of image carriers with the intermediate transfer belt in between, the plurality of image carriers being aligned along an outer periphery of the intermediate transfer belt, the image forming apparatus being capable of transferring a toner image formed by the intermediate transfer belt to a recording medium to form an image, wherein a filter unit is disposed inside of the intermediate transfer belt in parallel to a direction of extension of the belt rollers.

Advantageous Effects of Invention

According to the present invention, the first airflow path is formed along the bottom surface of the filter by the plurality of first ribs raised from the bottom surface of the chassis, and the second airflow path is formed along the top surface of the filter by the plurality of second ribs raised from the ceiling surface of the chassis.

The air having entered the interior of the chassis through the suction portion from the outside passes through the first gap, then flows through the first airflow path formed along the bottom surface of the filter, and then passes through the filter from below to above, and the air having passed through the filter flows through the second airflow path formed along the top surface of the filter, then passes through the second gap, and is then exhausted through the exhaust portion to the outside.

Since the first airflow path and the second airflow path extend, not in a direction perpendicular to air-passing surfaces of the filter, but along the air-passing surfaces, the thickness of the chassis housing the filter can be reduced. Therefore, the filter unit can be thinned, thus preventing size expansion of an apparatus in which the filter unit is mounted, for example, an image forming apparatus.

Since, in the filter unit according to the present invention, the air passes through the filter from below to above and flows through the interior of the filter in a direction against the gravitational force, powder particles (for example, scattered toner) collected by the filter and deposited on a lower portion of the filter are likely to fall into the first airflow path under their own weights, which can reduce the clogging of the filter to keep a smooth flow of the air.

BRIEF DESCRIPTION OF DRAWINGS

FIG. 6 is an explanatory view for illustrating air flow in the filter unit.

Hereinafter, a description will be given of a filter unit and an image forming apparatus including the filter unit, both according to an embodiment of the present disclosure, with reference to the drawings. FIG. 1A is a side view showing an internal structure of one embodiment of an image forming apparatus according to the present disclosure. FIG. 1B is a front view schematically showing an image forming section constituting part of an image forming apparatus according to a first embodiment of the present disclosure and its surrounding portions. An image forming apparatus 1 is a multifunction peripheral having multiple functions including, for example, a copy function, a print function, a scan function, and a facsimile function.

Figure 1A:
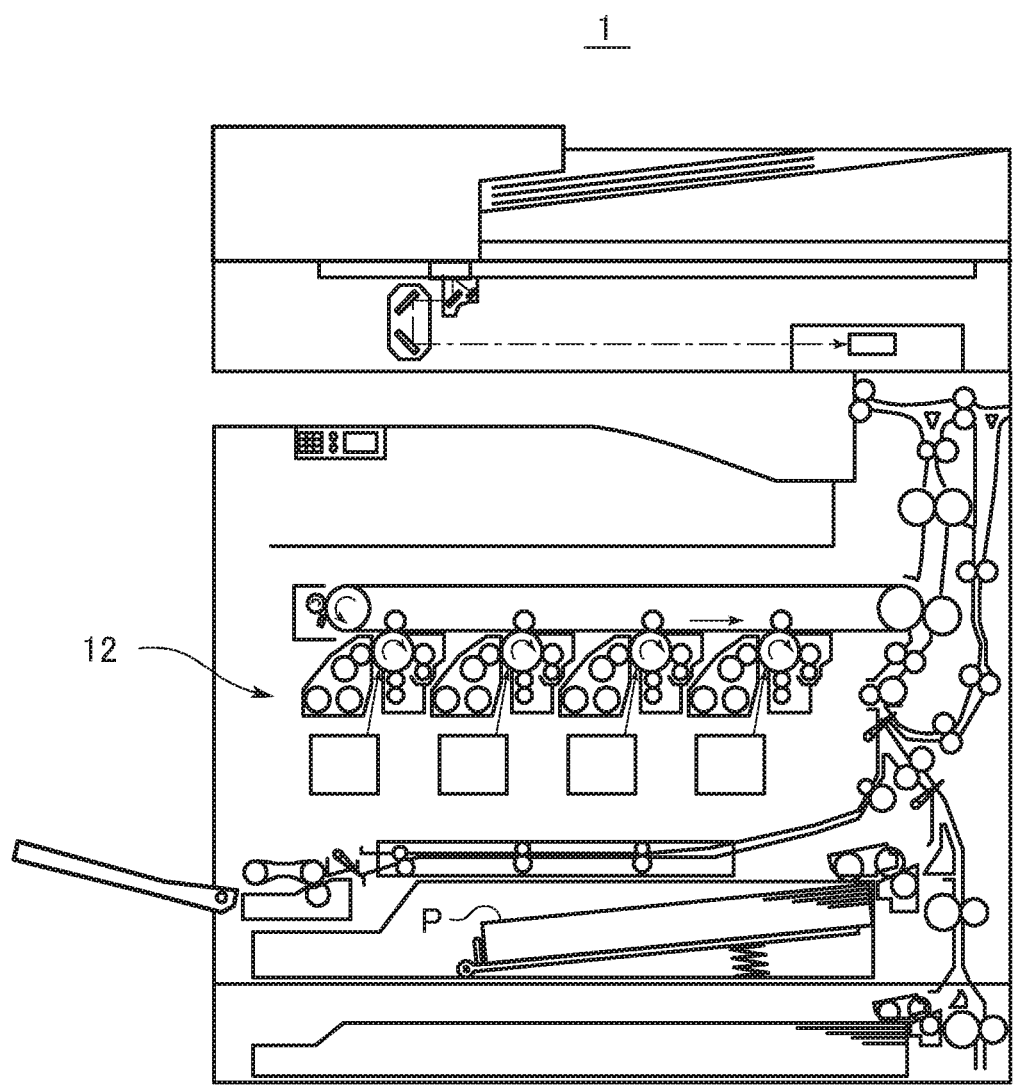
FIG. 1A is a side view showing an internal structure of one embodiment of an image forming apparatus according to the present invention.

A description will be given below of the case where an image forming operation is performed by the image forming apparatus 1. An image forming section 12 forms a toner image on a recording paper sheet P (recording medium) fed from a sheet feed section, based on image data generated by a document reading operation, image data stored on an internal HDD (hard disk drive), image data received from a network-connected computer or other images.

The image forming section 12 is made up by including an image forming unit 12Bk for black (Bk), an image forming unit 12Y for yellow (Y), an image forming unit 12C for cyan (C), and an image forming unit 12M for magenta (M). The image forming units 12Bk, 12Y, 12C, and 12M include their respective photosensitive drums 121Bk, 121Y, 121C, and 121M serving as image carriers, their respective charging devices 220 capable of charging the surfaces of the photosensitive drums 121Bk, 121Y, 121C, and 121M, and their respective developing devices 230 capable of forming respective toner images on the photosensitive drums 121Bk, 121Y, 121C, and 121M. The photosensitive drums 121Bk, 121Y, 121C, and 121M are driven into rotation clockwise in the figure.

An intermediate transfer unit 120 is made up by including: an intermediate transfer belt 125 having an outer peripheral surface to which toner images are to be transferred; a drive roller 123; a driven roller 124; a plurality of primary transfer rollers 126; and a tension roller 127.

The primary transfer rollers 126 are disposed opposite to the respective associated photosensitive drums 121Bk, 121Y, 121C, and 121M aligned along the outer periphery of the intermediate transfer belt 125, with the intermediate transfer belt 125 in between. The primary transfer roller 126 is an example of the transfer roller defined in the Claims.

The intermediate transfer belt 125 is mounted between the drive roller 123 and the driven roller 124, driven in engagement against the peripheral surfaces of the photosensitive drums 121Bk, 121Y, 121C, and 121M by the drive roller 123, and travels in an endless path around the rollers 123, 124 while synchronizing with each photosensitive drum 121Bk, 121Y, 121C, 121M. The drive roller 123 drives the intermediate transfer belt 125 while rotating counterclockwise in the figure. The intermediate transfer belt 125 is supported from inside by the tension roller 127 disposed in the vicinity of the driven roller 124. The drive roller 123 and the driven roller 124 are examples of the belt rollers defined in the Claims.

The peripheral surfaces of the photosensitive drums 121Bk, 121Y, 121C, and 121M are uniformly electrically charged (charging process) and the charged surfaces of the photosensitive drums 121Bk, 121Y, 121C, and 121M are irradiated with laser light based on image data to form respective latent images thereon (exposure process). The latent images formed on the surfaces of the photosensitive drums 121Bk, 121Y, 121C, and 121M are made visible with toner fed from developing rollers 231 each constituting part of the associated developing device 230 (development process), and the toner images formed by making the visible images are transferred onto the intermediate transfer belt 125 by the primary transfer rollers 126.

The toner images of different colors (black, yellow, cyan, and magenta) transferred to the intermediate transfer belt 125 are superimposed on each other on the intermediate transfer belt 125 by adjusting their transfer timings, resulting in a multicolor toner image.

A secondary transfer roller 210 transfers the multicolor toner image formed on the surface of the intermediate transfer belt 125, at a nip N between the secondary transfer roller 210 and the drive roller 123 with the intermediate transfer belt 125 in between, to a recording paper sheet P conveyed from the sheet feed section.

Filter units 300 collect powder particles, such as toner, scattered without adhering to the photosensitive drums 121Bk, 121Y, 121C, and 121M and they are disposed inside of the intermediate transfer belt 125 mounted around the drive roller 123 and the driven roller 124. Each filter unit 300 is disposed between adjacent two of the primary transfer rollers 126. Each filter unit 300 is disposed so that the direction of extension of its upstream first ribs 323, its downstream first ribs 324, its upstream second ribs 313, and its downstream second ribs 314 is parallel to the direction of width of the intermediate transfer belt 125 perpendicular to the direction of travel of the intermediate transfer belt 125. The upstream first rib 323 and the downstream first rib 324 are examples of the first rib defined in the Claims. The upstream second rib 313 and the downstream second rib 314 are examples of the second rib defined in the Claims.

Figure 2:
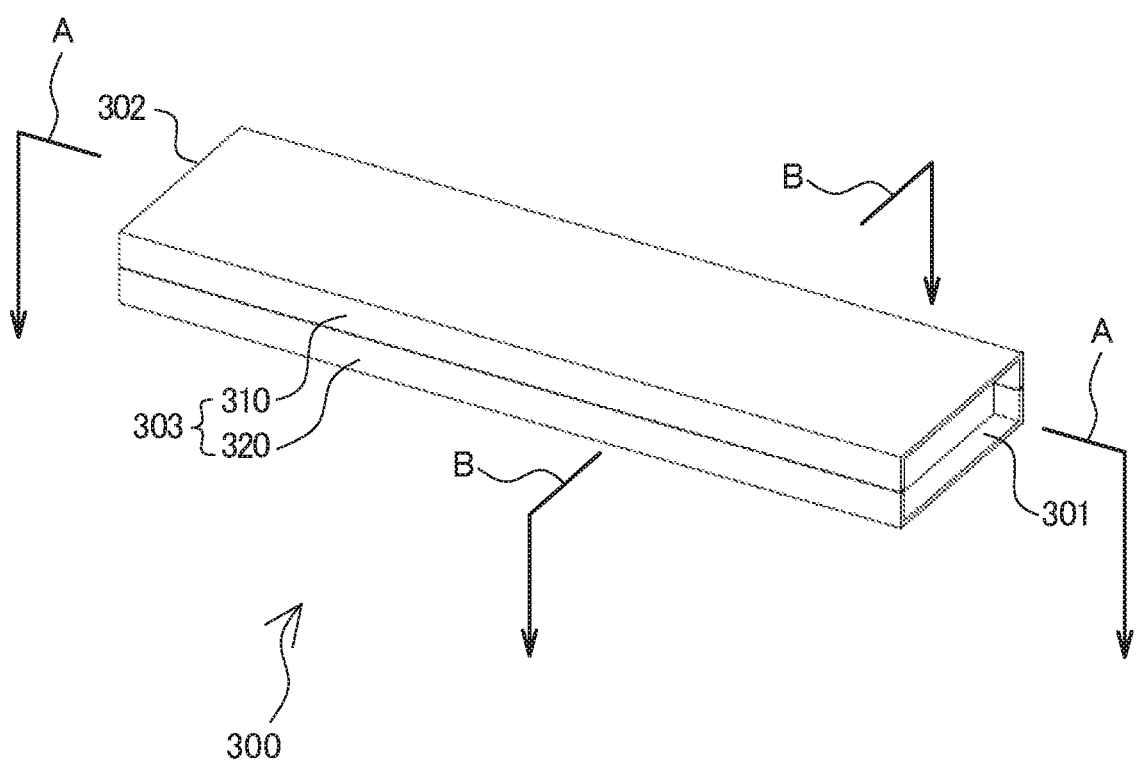
FIG. 2 is a perspective view showing a filter unit.

FIG. 2 is a perspective view showing the filter unit 300. The filter unit 300 includes a chassis 303 having, for example, a rectangular shape, provided at its front end with a suction portion 301, provided at its rear end with an exhaust portion 302, and provided internally with a filter (not shown in FIG. 2) capable of collecting powder particles, such as toner. The chassis 303 is made up by connecting an upper cover 310 and a lower cover 320.

Figure 3A:
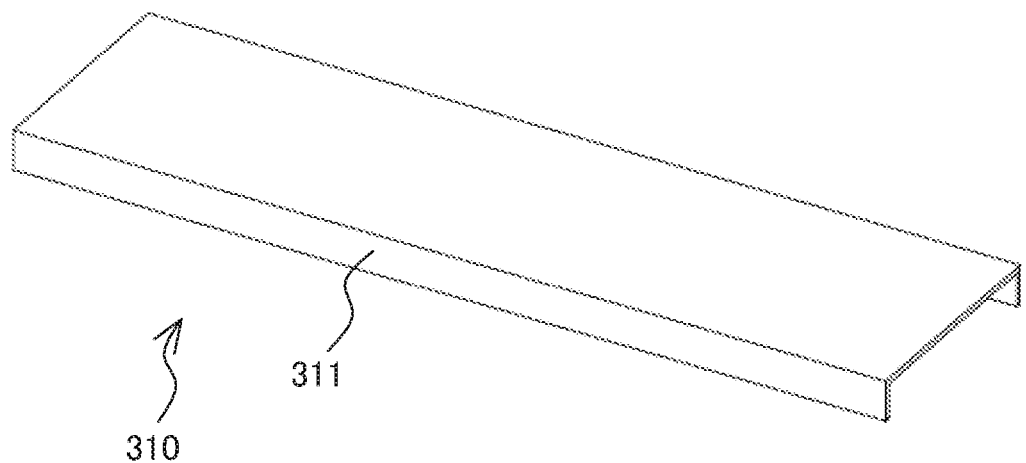
FIG. 3A is a perspective view of an upper cover of the filter unit when viewed from above.
Figure 3B:
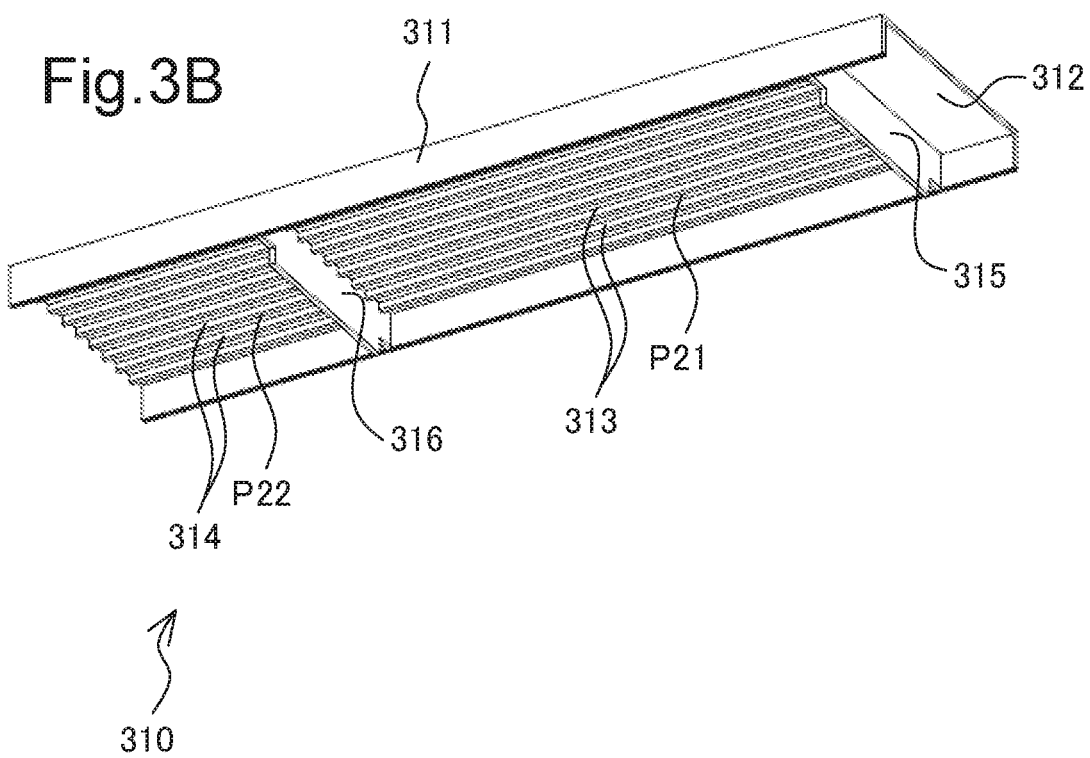
FIG. 3B is a perspective view of the upper cover of the filter unit when viewed from below.
Figure 4A:
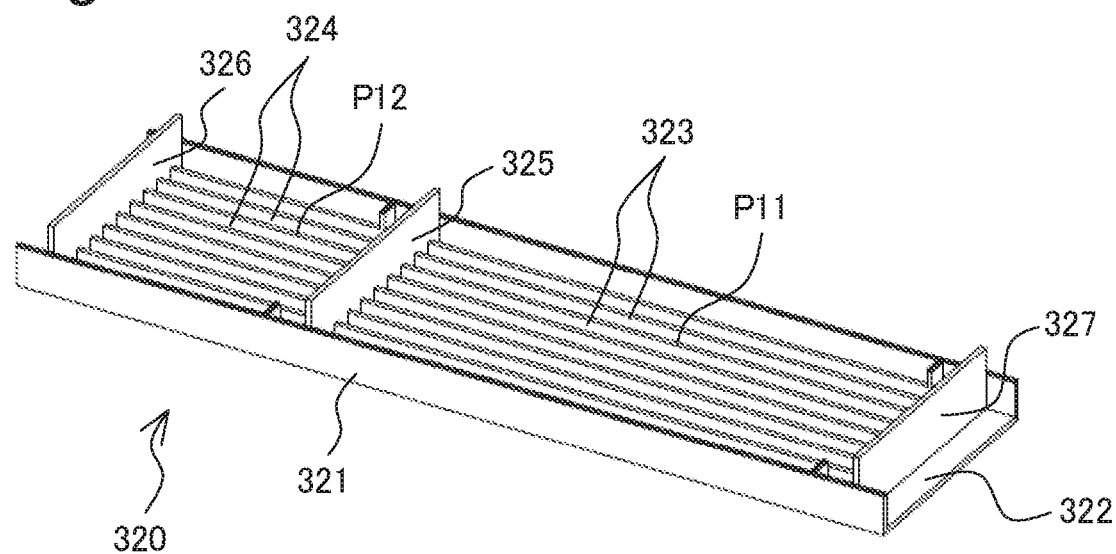
FIG. 4A is a perspective view of a lower cover of the filter unit when viewed from above.
Figure 4B:
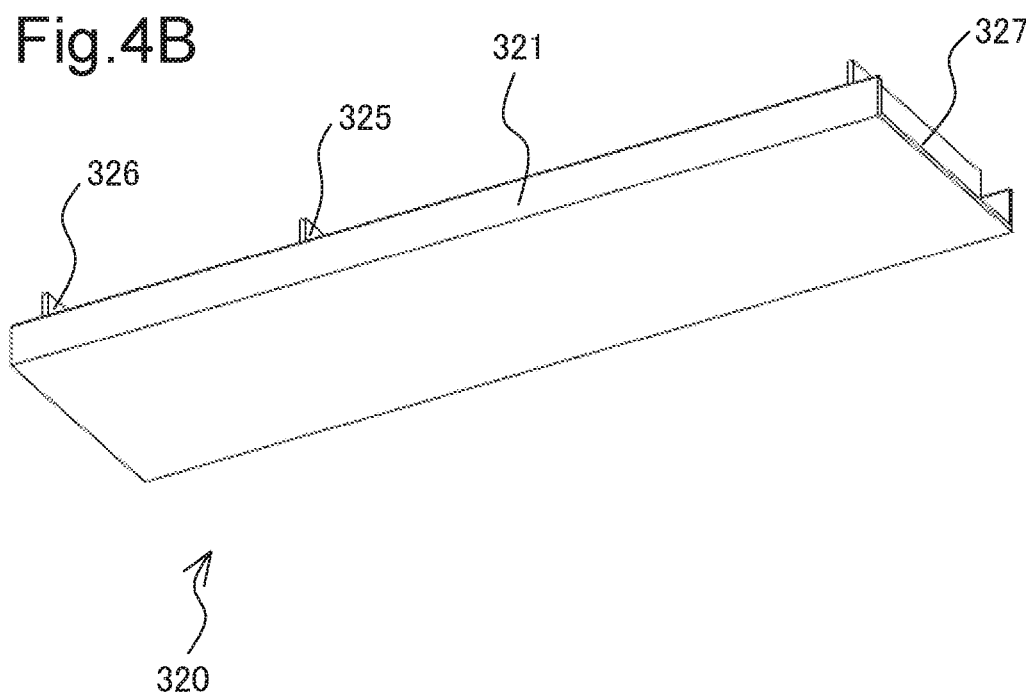
FIG. 4B is a perspective view of the lower cover of the filter unit when viewed from below.

FIG. 3A is a perspective view of the upper cover 310 of the filter unit 300 when viewed from above. FIG. 3B is a perspective view of the upper cover 310 of the filter unit 300 when viewed from below. FIG. 4A is a perspective view of the lower cover 320 of the filter unit 300 when viewed from above. FIG. 4B is a perspective view of the lower cover 320 of the filter unit 300 when viewed from below.

Figure 5A:
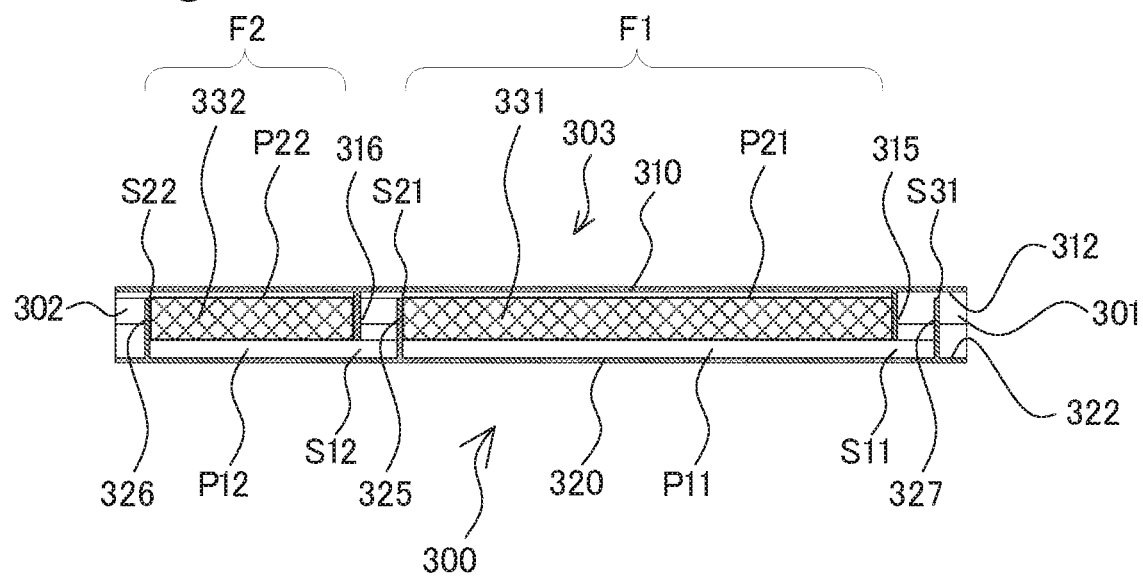
FIG. 5A is a cross-sectional view of the filter unit taken along a line A-A in FIG. 2.
Figure 5B:
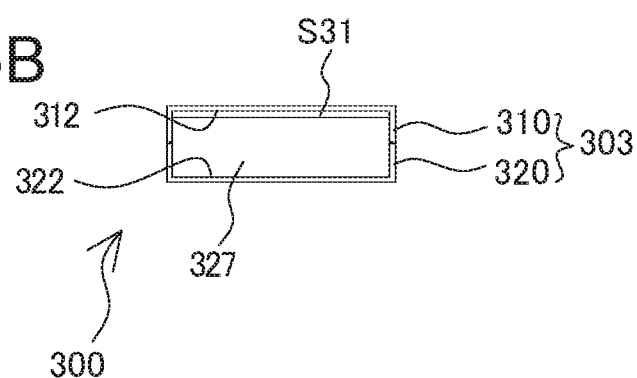
FIG. 5B is a front view of the filter unit.
Figure 5C:
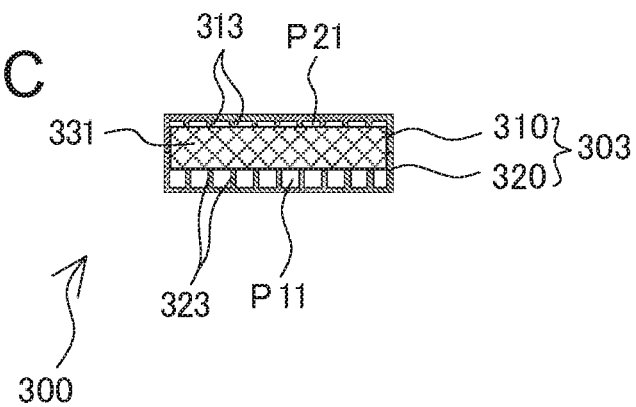
FIG. 5C is a cross-sectional view of the filter unit taken along a line B-B in FIG. 2.

FIG. 5A is a cross-sectional view of the filter unit 300 taken along the line A-A in FIG. 2. FIG. 5B is a front view of the filter unit 300. FIG. 5C is a cross-sectional view of the filter unit 300 taken along the line B-B in FIG. 2.

The lower cover 320 includes a plurality of upstream first ribs 323 and a plurality of downstream first ribs 324, each disposed parallel to sidewalls 321 of the lower cover 320 to rise from a bottom surface 322 thereof toward the inside of the chassis 303. The plurality of upstream first ribs 323 form an upstream first airflow path P11 between an upstream filter 331 and the bottom surface 322, while the plurality of downstream first ribs 324 form a downstream first airflow path P12 between a downstream filter 332 and the bottom surface 322. The upstream first airflow path P11 and the downstream first airflow path P12 are examples of the first airflow path defined in the Claims.

The upper cover 310 includes a plurality of upstream second ribs 313 and a plurality of downstream second ribs 314, each disposed parallel to sidewalls 311 of the upper cover 310 to rise from a ceiling surface 312 thereof. The plurality of upstream second ribs 313 form an upstream second airflow path P21 between the upstream filter 331 and the ceiling surface 312, while the plurality of downstream second ribs 314 form a downstream second airflow path P22 between the downstream filter 332 and the ceiling surface 312. The upstream first ribs 323, downstream first ribs 324, upstream second ribs 313, and downstream second ribs 314 are each formed to have an inter-rib pitch of, for example, 20 mm or less. The upstream second airflow path P21 and the downstream second airflow path P22 are examples of the second airflow path defined in the Claims.

The plurality of upstream first ribs 323 are provided along the direction of extension of the upstream first rib 323 and downstream first rib 324 (i.e., the direction of air flow in the chassis 303) and side by side, while the plurality of upstream second ribs 313 are provided along the direction of extension of the upstream second rib 313 and downstream second rib 314 (i.e., the direction of air flow in the chassis 303) and side by side. If the inter-rib pitch is narrowed, the air flow becomes faster and the atmospheric pressure decreases, so that the outside air becomes more likely to be sucked in. Therefore, the upstream first ribs 323 and upstream second ribs 313 formed in the upstream side of the air flow (hereinafter referred to simply as the upstream side) where air needs to be taken in preferably have a narrower inter-rib pitch than the downstream first ribs 324 and downstream second ribs 314 formed in the downstream side of the air flow (hereinafter referred to simply as the downstream side).

The upstream filter 331 disposed in the interior of the chassis 303 constituted by the upper cover 310 and the lower cover 320 and located in a front stage (the upstream side) of the chassis 303 is held sandwiched between the plurality of upstream first ribs 323 and the plurality of upstream second ribs 313 from above and below, while the downstream filter 332 disposed in the interior of the chassis 303 and located in a rear stage (the downstream side) of the chassis 303 is held sandwiched between the plurality of downstream first ribs 324 and the plurality of downstream second ribs 314 from above and below. In addition, the upstream filter 331 and the downstream filter 332 are also held sandwiched between the sidewalls 311 and 321 of the chassis 303 (the upper cover 310 and the lower cover 320) from the right and left sides. Specifically, the upstream filter 331 and the downstream filter 332 are disposed in the interior of the chassis 303 so as to be sandwiched by the plurality of upstream first ribs 323, the plurality of downstream first ribs 324, the plurality of upstream second ribs 313, and the plurality of downstream second ribs 314 while leaving spaces between the upstream and downstream filters 331, 332 and the ceiling and bottom surfaces 312, 322.

The upstream filter 331 disposed in the upstream side preferably has a lower collection efficiency than the downstream filter 332 disposed in the downstream side. For example, the downstream filter 332 is finer than the upstream filter 331. Thus, powder particles can be collected dispersedly throughout the filter unit 300.

Furthermore, the inside of each filter may be configured so that its upstream side has a lower collection efficiency than its downstream side. For example, in the upstream filter 331, the coarseness may gradually decrease from the front end to the rear end (from the upstream end to the downstream end).

Moreover, the upstream filter 331 disposed in the upstream side is preferably larger than the downstream filter 332 disposed in the downstream side (for example, in terms of volume, projected area, and length in the direction of extension of the upstream first ribs 323, the downstream first ribs 324, the upstream second ribs 313, and the downstream second ribs 314). This embodiment employs a structure in which the upstream filter 331 is longer than the downstream filter 332 in the direction of extension of the upstream first ribs 323, the downstream first ribs 324, the upstream second ribs 313, and the downstream second ribs 314. The reason for this is that since the upstream filter 331 disposed in the upstream side is coarser and therefore has a lower collection efficiency, the collection performance is increased by increasing the volume.

The upper cover 310 includes an upstream first shield plate 315 raised from the ceiling surface 312 of the upper cover 310 to cover up the front end of the upstream filter 331 while forming an upstream first gap S11 with the bottom surface 322 of the lower cover 320. The reason for this is that air having entered the chassis 303 through the suction portion 301 from the outside, having passed through a third gap S31 to be described hereinafter, and then having passed through the upstream first gap S11 is directed to the upstream first airflow path P11. The upstream first shield plate 315 is provided so that the upstream first gap S11 has a vertical dimension equal to or smaller than that of the upstream first airflow path P11 (or the upstream first ribs 323).

The upper cover 310 further includes a downstream first shield plate 316 raised from the ceiling surface 312 of the upper cover 310 to cover up the front end of the downstream filter 332 while forming a downstream first gap S12 with the bottom surface 322 of the lower cover 320. The reason for this is that air having passed through an upstream second gap S21 and then having passed through the downstream first gap S12 is directed to the downstream first airflow path P12. The downstream first shield plate 316 is provided so that the downstream first gap S12 has a vertical dimension equal to or smaller than that of the downstream first airflow path P12 (or the downstream first ribs 324).

If the upstream first gap S11 and the downstream first gap S12 have a larger vertical dimension than the upstream first airflow path P11 and the downstream first airflow path P12, respectively, the air may not be directed to the upstream first airflow path P11 and the downstream first airflow path P12, respectively, but may directly enter the upstream filter 331 and the downstream filter 332 through their front surfaces, respectively. The upstream first gap S11 and the downstream first gap S12 are examples of the first gap defined in the Claims.

The upstream first shield plate 315 and the downstream first shield plate 316 are provided to extend in the direction perpendicular to the direction of extension of the upstream first ribs 323, the downstream first ribs 324, the upstream second ribs 313, and the downstream second ribs 314. The upstream first shield plate 315 and the downstream first shield plate 316 are examples of the first shield plate defined in the Claims.

On the other hand, the lower cover 320 includes an upstream second shield plate 325 raised from the bottom surface 322 of the lower cover 320 to cover up the rear surface of the upstream filter 331 while forming an upstream second gap S21 with the ceiling surface 312 of the upper cover 310. The upstream second shield plate 325 is provided so that the upstream second gap S21 has a vertical dimension equal to or smaller than that of the upstream second airflow path P21 (or the upstream second ribs 313).

The lower cover 320 further includes a downstream second shield plate 326 raised from the bottom surface 322 of the lower cover 320 to cover up the rear surface of the downstream filter 332 while forming a downstream second gap S22 with the ceiling surface 312 of the upper cover 310. The downstream second shield plate 326 is provided so that the downstream second gap S22 has a vertical dimension equal to or smaller than that of the downstream second airflow path P22 (or the downstream second ribs 314).

The upstream second shield plate 325 and the downstream second shield plate 326 are provided for the purpose of directing the air passing through the upstream filter 331 toward the upstream second airflow path P21 and for the purpose of directing the air passing through the downstream filter 332 toward the downstream second airflow path P22, respectively. If the upstream second gap S21 and the downstream second gap S22 have a larger vertical dimension than the upstream second airflow path P21 and the downstream second airflow path P22, respectively, the air may not be directed to the upstream second airflow path P21 and the downstream second airflow path P22, respectively, but may exit through the rear surfaces of the upstream filter 331 and the downstream filter 332, respectively. The upstream second gap S21 and the downstream second gap S22 are examples of the second gap defined in the Claims. The upstream second shield plate 325 and the downstream second shield plate 326 are examples of the second shield plate defined in the Claims.

The upstream filter 331 is held sandwiched between the upstream first shield plate 315 and the upstream second shield plate 325 from the front and rear sides, while the downstream filter 332 is held sandwiched between the downstream first shield plate 316 and the downstream second shield plate 326 from the front and rear sides.

The upstream filter 331 is held sandwiched between the upstream first shield plate 315 and the upstream second shield plate 325 in the direction of extension of the upstream first ribs 323, the downstream first ribs 324, the upstream second ribs 313, and the downstream second ribs 314 and held sandwiched between the sidewalls 311 and 321 in the direction perpendicular to the direction of extension of the upstream first ribs 323, the downstream first ribs 324, the upstream second ribs 313, and the downstream second ribs 314.

On the other hand, the downstream filter 332 is held sandwiched between the downstream first shield plate 316 and the downstream second shield plate 326 in the direction of extension of the upstream first ribs 323, the downstream first ribs 324, the upstream second ribs 313, and the downstream second ribs 314 and held sandwiched between the sidewalls 311 and 321 in the direction perpendicular to the direction of extension of the upstream first ribs 323, the downstream first ribs 324, the upstream second ribs 313, and the downstream second ribs 314.

The lower cover 320 further includes a third shield plate 327 in the vicinity of the suction portion 301 through which air is sucked from the outside into the chassis 303. The third shield plate 327 is provided to extend and rise from the bottom surface 322 of the lower cover 320 while forming the third gap S31 with the ceiling surface 312 of the upper cover 310. The third shield plate 327 has, for example, the effect of preventing powder particles accumulated in the upstream first airflow path P11 from leaking to the outside. The third shield plate 327 extends in the direction perpendicular to the direction of extension of the upstream first ribs 323, the downstream first ribs 324, the upstream second ribs 313, and the downstream second ribs 314 and is disposed somewhere between the suction portion 301 and the upstream first shield plate 315 in the direction of extension of the upstream first ribs 323, the downstream first ribs 324, the upstream second ribs 313, and the downstream second ribs 314.

FIG. 6 is an explanatory view for illustrating air flow in the filter unit 300, wherein the air flow in the filter unit 300 is indicated by the arrows. The interior of the image forming apparatus 1 in which the filter unit 300 is mounted is designed to have high confidentiality in order to prevent toner scattering or the like. Therefore, surrounding air is sucked through the suction portion 301 into the filter unit 300 by operating a suction fan 180 disposed on the exhaust side of the filter unit 300 to lower the atmospheric pressure in the filter unit 300 and thus produce a slight pressure difference from the surrounding area.

Figure 1B:
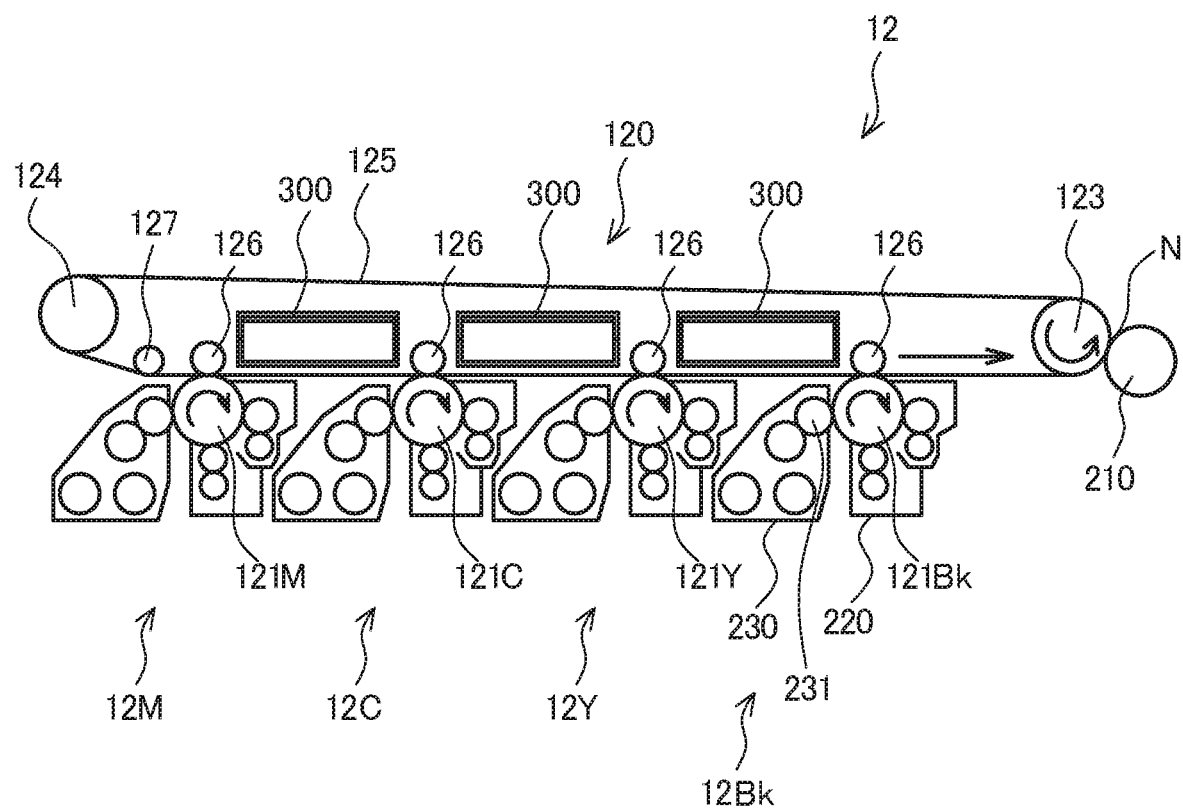
FIG. 1B is a front view schematically showing an image forming section constituting part of an image forming apparatus according to a first embodiment of the present invention and its surrounding portions.
Figure 7:
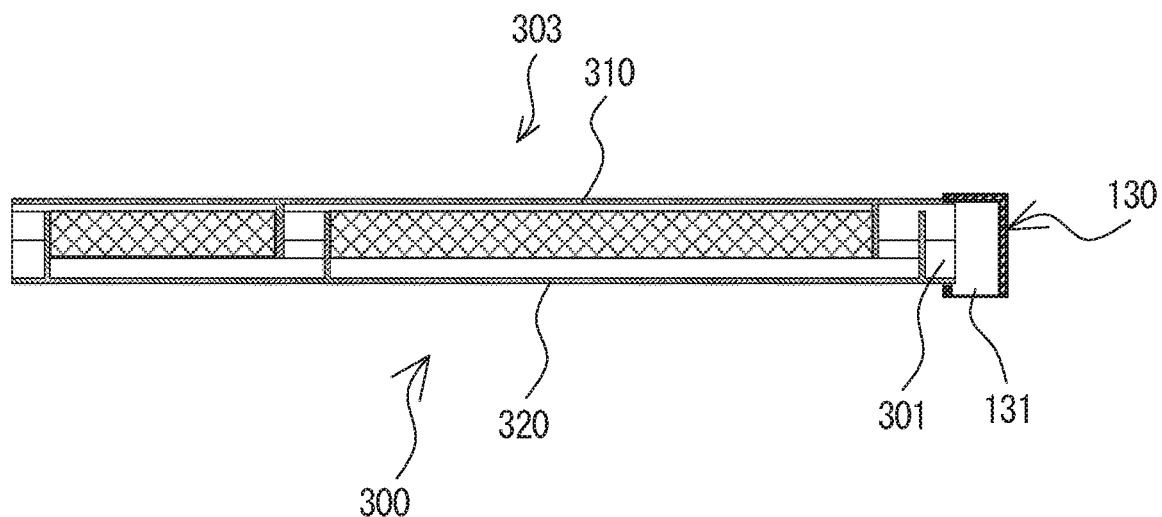
FIG. 7 is a cross-sectional view showing a filter unit according to another embodiment.

In another embodiment, as shown in FIG. 7, the chassis 303 may include a suction duct 130 connected to the suction portion 301. A suction port 131 of the suction duct 130 opens downward. Specifically, the suction port 131 is oriented toward where the photosensitive drum 121Bk or the like (see FIG. 1B) is disposed, and opens toward where scattered toner generates. Thus, scattered toner can be more effectively taken into the chassis 303.

The air taken through the suction portion 301 into the interior of the filter unit 300 passes through the third gap S31 and the upstream first gap S11, then flows through the upstream first airflow path P11, and then flows through the upstream filter 331 from below to above against the direction of gravitational force, that is, toward the upstream second airflow path P21.

The air having passed through the upstream filter 331 flows through the upstream second airflow path P21, then passes through the upstream second gap S21 and the downstream first gap S12, and then flows through the downstream first airflow path P12. Subsequently, the air flows from below to above against the direction of gravitational force to pass through the downstream filter 332, then flows through the downstream second airflow path P22, then passes through the downstream second gap S22, and is then exhausted through the exhaust portion 302 to the outside. Powder particles contained in the air are collected by the upstream filter 331 and the downstream filter 332 during passage of the air through the upstream filter 331 and the downstream filter 332.

As thus far described, in this embodiment, the upstream first airflow path P11 and the downstream first airflow path P12 are formed along the bottom surfaces of the upstream filter 331 and the downstream filter 332 by the plurality of upstream first ribs 323 and the plurality of downstream first ribs 324 all of which are raised from the bottom surface 322 of the chassis 303 (the lower cover 320). Furthermore, the upstream second airflow path P21 and the downstream second airflow path P22 are formed along the top surfaces of the upstream filter 331 and the downstream filter 332 by the plurality of upstream second ribs 313 and the plurality of downstream second ribs 314 all of which are raised from the ceiling surface 312 of the chassis 303 (the upper cover 310).

Since the upstream first airflow path P11, the downstream first airflow path P12, the upstream second airflow path P21, and the downstream second airflow path P22 extend, not in a direction perpendicular to air-passing surfaces of the upstream filter 331 and the downstream filter 332, but along the air-passing surfaces, the thickness of the chassis 303 housing the upstream filter 331 and the downstream filter 332 can be reduced. Therefore, the filter unit 300 can be reduced in thickness, thus preventing the size expansion of the image forming apparatus 1 in which the filter unit 300 is mounted.

Since, as described above, the air passes through the upstream filter 331 and the downstream filter 332 from below to above and flows through the upstream filter 331 and the downstream filter 332 against the direction of gravitational force, powder particles collected by the upstream filter 331 and the downstream filter 332 and deposited on lower portions of the filters are likely to fall into the upstream first airflow path P11 and the downstream first airflow path P12 under their own weights, which can reduce clogging of the upstream filter 331 and the downstream filter 332 to keep smooth flow of the air.

For example, resin is preferred as a material for the chassis 303, the upstream first ribs 323, the downstream first ribs 324, the upstream second ribs 313, the downstream second ribs 314, the upstream first shield plate 315, the downstream first shield plate 316, the upstream second shield plate 325, the downstream second shield plate 326, and the third shield plate 327, by all of which the filter unit 300 is formed.

If the powder particles, such as toner, collected by the upstream filter 331 and the downstream filter 332 fall under their own weights, the fallen powder particles are accumulated in the upstream first airflow path P11 and the downstream first airflow path P12. If the amount of powder particles accumulated in the upstream first airflow path P11 and the downstream first airflow path P12 becomes excessive, the spaces for passage of air flow in the upstream first airflow path P11 and the downstream first airflow path P12 may not be able to be secured.

Therefore, the height of the upstream first ribs 323 and the downstream first ribs 324 forming the upstream first airflow path P11 and the downstream first airflow path P12, respectively, is preferably selected at a height at which the spaces for passage of air flow can be secured even if powder particles are accumulated in the upstream first airflow path P11 and the downstream first airflow path P12.

On the other hand, the amount of powder particles accumulated in the upstream second airflow path P21 and the downstream second airflow path P22 is small as compared to that in the upstream first airflow path P11 and the downstream first airflow path P12. In addition, it is preferred to reduce the thickness of the filter unit 300. Therefore, the height of the upstream second ribs 313 (i.e., the length thereof from the ceiling surface 312 toward the upstream filter 331 and the downstream filter 332) is preferably lower than the height of the upstream first ribs 323 and, likewise, the height of the downstream second ribs 314 (i.e., the length thereof from the ceiling surface 312 toward the upstream filter 331 and the downstream filter 332) is preferably lower than the height of the downstream first ribs 324.

The above embodiment illustrates a configuration in which a filter mechanism containing the upstream filter 331 located in the upstream side and the upstream first ribs 323, the upstream second ribs 313, the upstream first shield plate 315, and the upstream second shield plate 325 all formed to surround the upstream filter 331 (for example, an upstream filter mechanism F1 shown in FIG. 5A), and a filter mechanism containing the downstream filter 332 located in the downstream side and the downstream first ribs 324, the downstream second ribs 314, the downstream first shield plate 316, and the downstream second shield plate 326 all formed to surround the downstream filter 332 (for example, a downstream filter mechanism F2 shown in FIG. 5A) are aligned in series from the front to the rear of the chassis 303 and connected to each other. However, the present invention is not limited to this configuration and the filter unit may have, not a configuration in which a plurality of filter mechanisms are aligned, but a configuration formed of a single filter mechanism.

Furthermore, the structure and processing shown in the above embodiment with reference to FIGS. 1A to 7 are merely an embodiment of the present invention and not intended to limit the present invention to the above particular structure and processing.

The invention claimed is:

1. A filter unit comprising: a rectangular parallelepipedic chassis that has a suction portion provided at a front side thereof to suck air therethrough, has an exhaust portion provided at a rear side thereof to exhaust the air therethrough, and is provided internally with a filter capable of collecting powder particles;
   a plurality of first ribs disposed parallel to sidewalls of the chassis to rise from a bottom surface of the chassis toward an interior of the chassis and forming a first airflow path; and
   a plurality of second ribs disposed parallel to the sidewalls of the chassis to rise from a ceiling surface of the chassis toward the interior of the chassis and forming a second airflow path,
   wherein the filter is disposed in the interior of the chassis so as to be sandwiched by the plurality of first ribs and the plurality of second ribs while leaving spaces between the filter and the ceiling and bottom surfaces, and
   wherein the filter unit further comprises:
   a first shield plate that extends in a direction perpendicular to a direction of extension of the first ribs and the second ribs and is raised from the ceiling surface of the chassis toward the interior of the chassis to cover up a front end of the filter while forming a first gap with the bottom surface of the chassis; and
   a second shield plate that extends in the direction perpendicular to the direction of extension of the first ribs and the second ribs and is raised from the bottom surface of the chassis toward the interior of the chassis to cover up a rear end of the filter while forming a second gap with the ceiling surface of the chassis.

2. The filter unit according to claim 1, wherein the filter is held sandwiched between the first shield plate and the second shield plate in the direction of extension of the first ribs and the second ribs and held sandwiched between the sidewalls in the direction perpendicular to the direction of extension of the first ribs and the second ribs.

3. The filter unit according to claim 1, wherein a height of the first ribs is set larger than a height of the second ribs.

4. The filter unit according to claim 1, further comprising a third shield plate that is provided in the suction portion, extends in the direction perpendicular to the direction of extension of the first ribs and the second ribs, is disposed between the suction portion and the first shield plate in the direction of extension of the first ribs and the second ribs while forming a third gap with the ceiling surface of the chassis, and is raised from the bottom surface of the chassis toward the interior of the chassis.

5. The filter unit according to claim 1, wherein a plurality of filter mechanisms are arranged from the front side toward the rear side of the chassis in connection with each other in the direction of extension of the first ribs and the second ribs, each of the plurality of filter mechanisms including the filter and the first ribs, the second ribs, the first shield plate, and the second shield plate all formed to surround the filter.

6. The filter unit according to claim 5, wherein, among the filters contained in the filter mechanisms, the filter disposed in an upstream side in a direction of air flow is larger in dimension in the direction of extension of the first ribs and the second ribs than the filter disposed in a downstream side in the direction of air flow.

7. The filter unit according to claim 5, wherein, among the first ribs and second ribs contained in the filter mechanisms, the first ribs and second ribs formed in the upstream side have a narrower inter-rib pitch than the first ribs and second ribs formed in the downstream side.

8. The filter unit according to claim 5, wherein, among the filters contained in the filter mechanisms, the filter disposed in an upstream side in a direction of air flow has a lower collection efficiency for collecting the powder particles than the filter disposed in a downstream side in the direction of air flow.

9. The filter unit according to claim 1, wherein
the chassis comprises a suction duct connected to the suction portion, and
a suction port of the suction duct opens toward where image carriers are disposed.

10. An image forming apparatus comprising:
an intermediate transfer belt mounted around two belt rollers to travel in an endless path around the belt rollers; and
a plurality of transfer rollers disposed opposite to a plurality of image carriers with the intermediate transfer belt in between, the plurality of image carriers being aligned along an outer periphery of the intermediate transfer belt,
the image forming apparatus being capable of transferring a toner image formed by the intermediate transfer belt to a recording medium to form an image,
wherein the filter unit according to claim 1 is disposed inside of the intermediate transfer belt in parallel to a direction of extension of the belt rollers.

\* \* \* \* \*